June 12, 1951  L. J. SPERRY  2,556,453
ADJUSTABLE TUBULAR CAPACITOR
Filed Oct. 3, 1949

INVENTOR.
LEONARD J. SPERRY
BY John W. Michael
ATTORNEY

Patented June 12, 1951

2,556,453

UNITED STATES PATENT OFFICE 2,556,453

ADJUSTABLE TUBULAR CAPACITOR

Leonard J. Sperry, Milwaukee, Wis., assignor to Globe-Union Inc., Milwaukee, Wis., a corporation of Delaware Application October 3, 1949, Serial No. 119,348

5 Claims. (Cl. 175—41.5)

This invention relates to improvements in adjustable tubular capacitors particularly adapted for the fine tuning of radio frequency amplifiers and oscillators in television receivers and the like.

Heretofore variable tubular capacitors have had the inner electrode movable in a longitudinal direction within the tube and the cylindrical outer electrode to vary the capacity. This was generally accomplished by using a screw for the inner electrode or mounting the inner electrode on a screw so that rotation of the screw effected an adjustment of the capacitor by longitudinal movement of such inner electrode. Such capacitors are inadequate in the following respects: too many rotations of the screw are required to cover the range of the capacitor; there is too great an air gap between the screw and the dielectric ceramic tube thus unduly lessening the capacitance; they are relatively expensive to manufacture; the ceramic quickly wears the thread on the screw; and the screw sets up an undesirable variable series inductance.

It is an object of this invention, therefore, to provide an adjustable tubular capacitor which can be regulated over its entire range by rotating the rotor through not in excess of half a turn and thereby secure a capacity variation of over two and one-half micro-microfarads.

Another object is to provide an adjustable tubular capacitor which has the air gap between the inner electrode and the ceramic dielectric reduced to a minimum.

A still further object is to provide an adjustable tubular capacitor which is: economical to manufacture; less subject to wear; free from bothersome variable inductance; adjustable from either end; and capable of simultaneously controlling a plurality of balanced capacitances.

These objects are obtained by providing a ceramic tube with an outer electrode consisting of a layer of metal bonded to the cylindrical surface of the outside of said tube and extending circumferentially thereof for less than the full circumference of such tube and an inner electrode which rotates around the longitudinal axis of said tube on a bearing comprising the inner surface of said tube. The inner electrode has a cylindrical surface of less extent than a full circumference riding against the inner surface of the tube. Hence, it will require only a rotation of 180° or half a turn of the rotor to move the inner electrode from its farthest spaced position from the outer electrode to its nearest position with respect to such outer electrode. By using two such outer electrodes oppositely positioned on the tube and two such inner electrodes oppositely positioned on the rotor, the capacitor may be adjusted throughout its range by turning the rotor through ninety degrees or a quarter of a turn. The type of construction thus described permits the use of a film of lubricant in the form of a grease between the outer surface of the inner electrode and the inner surface of the ceramic dielectric tube. This lubricant has a dielectric constant greater than air and the film excludes air from between such electrode and tube, thus decreasing the air gap and materially increasing the capacitance rating of the capacitor. Both the ceramic tube and the rotor are readily and easily manufactured while still maintaining proper tolerances essential to provide a close fit between the surface of the inner electrode and the inner surface of the ceramic tube. The rotor is held against longitudinal displacement by the fingers of a coil fastener.

The novel features, which are considered characteristic of the invention, are set forth with particularity in the appended claims. The invention itself, however, both as to its organization and its method of operation, together with additional objects and advantages thereof, will best be understood from the following description of specific embodiments when read in connection with the accompanying drawing, in which:

Figure 7:
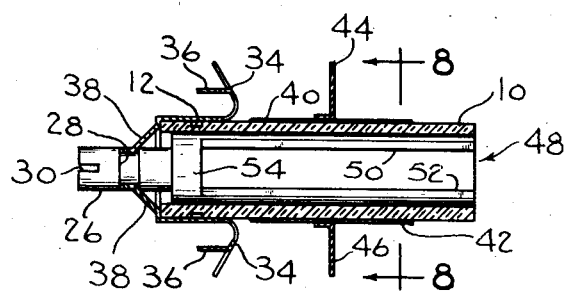
Fig. 7 is a sectional view (with the rotor shown in full) of an adjustable tubular capacitor embodying a modification of the capacitor viewed in Fig. 1, such modification requiring only a 90° rotation of the rotor to adjust the capacitor throughout its range.
Figure 8:
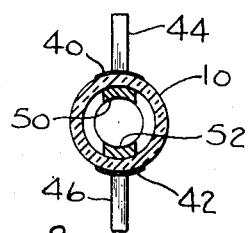

Fig. 8 is a sectional view taken on line 8—8 of Fig. 7 with parts beyond the section plane omitted.

Referring to the drawing by reference numerals, the adjustable tubular capacitor herein described has particular usage in the fine tuning of oscillators and radio frequency amplifiers used in television receivers. However, it is capable of other uses where capacitance must be intermittently adjusted during use and where such adjustment is best accomplished by the turning of a knob through less than a full rotation and where adjustment from either end by a screw driver or coin is desirable. The capacitor consists of a ceramic tube 10 on which is supported an outer electrode 14 and in which is rotatably mounted an inner electrode carrying rotor 18, such rotor being held against longitudinal displacement by fingers on a standard coil fastener such as that made by the Tinnerman Products Co. The tube 10 constitutes not only the support for both electrodes but also forms the dielectric of the capacitor. It may be made of a ceramic mixture, such as steatite, or a ceramic mixture containing titanium dioxide, or any of the well-known mixtures which have a satisfactory value of dielectric constant, proper resistance, low power factor, and sufficient mechanical strength. The tube may be provided with a groove 12 at one end thereof which cooperates with teeth on the coil fastener to hold such fastener on the tube.

Figure 1:
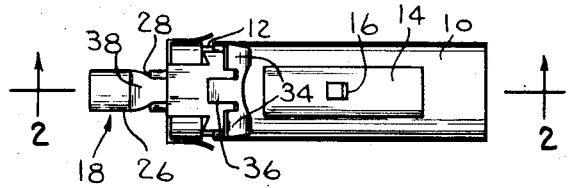
Fig. 1 is a view in top elevation of an adjustable tubular capacitor embodying the present invention.
Figure 2:
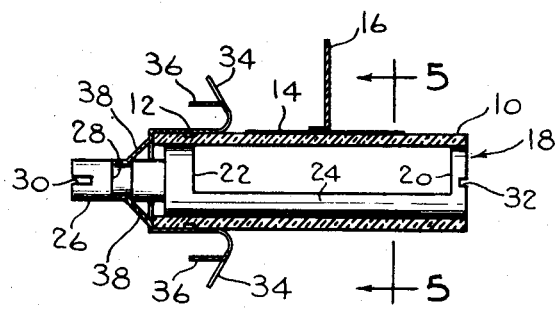
Fig. 2 is a sectional view (with the rotor shown in full) taken on line 2—2 of Fig. 1 showing the inner electrode in the minimum capacitance position with respect to the outer electrode.
Figure 3:
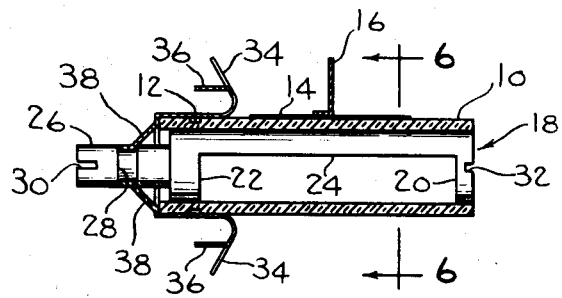
Fig. 3 is a sectional view (with the rotor shown in full) taken on line 2—2 of Fig. 1 showing the inner electrode in the maximum capacitance position with respect to the outer electrode.

In the modification shown in Figs. 1 to 3, inclusive, the outer electrode 14 consists of a layer of metal applied to a portion of the exterior of the tube 10, as shown in Fig. 1, by any one of several well-known methods, i. e. painting or spraying and firing a silver compound on the tube or chemical deposition. The electrode 14 is long and narrow. Its width circumferentially of the tube 10 is limited to substantially less than the outer circumference of such tube to provide a non-electrode area on the circumference of the tube between the edges of the electrode which constitutes the minimum capacity position of the capacitor when the inner electrode is adjacent such non-electrode area. A ribbon type lead 16 is soldered to the outer electrode 14 and extends radially of the tube.

Figure 5:
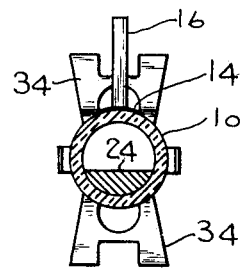
Fig. 5 is a sectional view taken on line 5—5 of Fig. 2.
Figure 6:
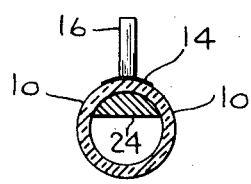
Fig. 6 is a sectional view taken on line 6—6 of Fig. 3 with parts beyond the section plane omitted.

The rotor 18 which carries the inner electrode 24 has a rear cylindrical bearing 20 and a front cylindrical bearing 22 which rotatably fit within the tube 10 and bear against the inner surface thereof so that said surfaces define the primary bearing and support the rotor. The inner electrode 24 has a cylindrical section which extends between and is carried by the bearings 20 and 22. The outer cylindrical surface of the inner electrode rides against the inner surface of the tube 10 as the rotor 18 rotates around the axis of the tube. A neck 26 provided with a retaining groove 28 projects from the bearing 22 outwardly of the tube 10. This neck is slotted at 30 to receive a screw driver or other tool to turn the rotor 18. The bearing 20 may also have a similar slot 32 which may be used for a like purpose. Thus the capacitor may be adjusted from either end. If necessary, the neck 26 and bearing 20 may be made longer so that the slots 30 and 32 are conveniently placed. In Figs. 2 and 5, the rotor 18 is shown with the inner electrode 24 in the minimum capacity position. As the rotor is turned through 180°, or half a turn, the inner electrode 24 will be rotated to the maximum capacity position shown in Figs. 3 and 6. One method of constructing the rotor 18 and inner electrode 24 is to machine a metal shaft having an outside diameter with proper tolerances for a close rotating fit within the tube 10 by (1) turning down the neck 26 and groove 28 and (2) milling away a portion of the shaft between the bearings 20 and 22 to leave the cylindrical section shown in Fig. 5. The inner electrode 24 may be made in other ways provided it has a cylindrical surface which rides against the inner surface of the tube 10 and the circumferential extent of such surface is sufficiently less than the full circumference of the inner surface of the tube to provide space between the part of the tube covered by the outer electrode 14 and the inner electrode 24 when in the minimum capacity position shown in Figs. 2 and 5.

The rotor 18 is held in position against longitudinal displacement by spring fingers 38 riding in the groove 28. These fingers are a part of the coil fastener heretofore described. The coil fastener also includes panel-engaging wings 34 and spring-fastening fingers 36 which are adapted to engage in a well-known manner with openings in a panel to hold the coil fastener and tube thereto. Teeth on the coil fastener engage with the grooves 12 to hold the tube 10 within the socket of the coil fastener.

The modification shown in Figs. 7 and 8 utilizes two outer electrodes and two inner electrodes and hence it may be adjusted from minimum to maximum capacity by a 90° rotation of the rotor. An outer electrode 40 is secured to the tube 10 in the same manner as heretofore described for outer electrode 14. A second outer electrode 42 is secured in a like manner to the tube 10 on the exterior thereof diametrically opposite the outer electrode 40. Both of these electrodes are respectively provided with copper ribbon leads 44 and 46. In this modification the rotor 48 carries two inner electrodes 50 and 52 diametrically oppositely positioned. The inner electrodes 50 and 52 each have a cylindrical surface which rides against the inner surface of the tube 10 as the rotor 48 is turned. The rotor 48 also has an end bearing 54 which rotatably fits within the tube 10 to support the inner electrodes. The neck and other parts of the rotor 48 are identical with that heretofore described in connection with rotor 18. In Figs. 7 and 8 the rotor is shown with the inner electrodes 50 and 52 in the maximum capacity position. As the rotor is turned 90° the electrodes 50 and 52 will be moved to the minimum capacity position. The rotor 48 may be made by center drilling a metal shaft and straddle milling opposite longitudinal flats which extend into the drilled opening to form the two electrodes. As in the case of the single electrode rotor, the electrodes may be made in other ways provided each has a cylindrical surface of limited circumferential extent which rides on the inner surface of the tube. In this modification the circumferential limit must provide sufficient non-electrode area to allow for a relative minimum capacitance position for both inner and outer electrodes.

Figure 4:
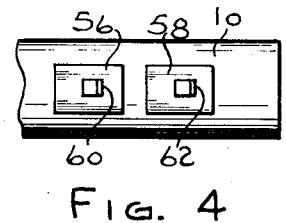
Fig. 4 is a fragmentary view in top elevation showing a modification of the invention which permits the simultaneous control of several capacitances.

If it is desired to adjust two capacitors simultaneously, two outer alined electrodes 56 and 58, as shown in Fig. 4, may be secured to the tube 10 in the same manner heretofore described. Each has a respective ribbon type lead 60 and 62. The electrodes 56 and 58 are electrically separated by an intermediate part of the ceramic tube 10 and are individually simultaneously affected by the adjustment of the inner electrode 24 as the rotor is turned.

The restricted relative rotation without longitudinal movement between the tube and the inner electrode permits the use of lubricant of grease-like consistency which has a dielectric constant greater than air. The lubricant forms a film or layer between the inner surface of the tube and the outer surface of the inner electrode and thus expels air from therebetween. This increases the effective capacitance of the capacitor. A reserve or supply of such lubricant may be contained in the space within the tube 10 on the inner side of the inner electrode and as the rotor is turned such reserve will replenish such film.

Although only several embodiments of the invention are shown and described herein, it will be understood that this application is intended to cover such other changes or modifications as come within the spirit of the invention or scope of the following claims.

I claim:

1. A tubular adjustable capacitor comprising a ceramic tube providing the support for the electrodes and forming the dielectric of the capacitor, said tube having a cylindrical outer electrode supporting surface the diameter of which is constant for the electrode supporting area thereof, said tube having a bore extending therethrough providing an inner cylindrical surface the diameter of which is constant for the area thereof in juxtaposition with the area of said electrode supporting surface whereby the thickness of said dielectric remains constant throughout such areas, an outer electrode comprising a layer of metal bonded to said cylindrical outer surface and extending circumferentially of said tube for less than half the circumference thereof, a metallic rotor having a cylindrical bearing mounted within said tube and slidably engaged with the inner surface of said bore whereby said surface defines the primary bearing for said rotor to rotatably guide said rotor in said tube, an inner electrode carried by said rotor and having a cylindrical surface riding against said inner cylindrical surface, said rotor cylindrical surface having a circumferential extent less than half the circumference of said bore, a neck for said rotor extending outwardly of said tube and having an annular groove therein, and a tube mounting member secured to said tube and having fingers in sliding contact with said groove to hold said rotor in place against axial displacement and provide an electrical connection for said inner electrode.

2. A tubular capacitor as claimed in claim 1 in which there is a second outer electrode on the exterior of said tube in alinement longitudinally with the first outer electrode and coacting electrically with said inner electrode simultaneously with the first outer electrode.

3. A tubular capacitor as claimed in claim 1 in which there is a second outer electrode on the exterior of said tube opposite from the first electrode and in which there is a second inner electrode opposite the first inner electrode whereby said capacitor is adjusted from minimum to maximum capacity by rotation of said inner electrodes about said longitudinal axis for not in excess of 90°.

4. A variable capacitor having one plate consisting of a rotatable metallic shaft having a cutaway semi-circular portion, a dielectric tube in which said shaft is mounted with the inner surface of said tube defining the primary bearing for the cylindrical portion of said shaft, the other plate of said capacitor comprising a conductive coating intimately bonded to the outer surface of said tube, and having a metallic mounting member serving as a support for the dielectric tube and having fingers in engagement with said shaft to limit axial movement of said rotor and serve as the electrical contact for the rotor.

5. A variable capacitor having one plate consisting of a metallic rotor having a cylindrical portion acting as a bearing and a cutaway portion, a dielectric tube of ceramic material suitable for insulation of high frequency electrical circuits, the inner surface of said tube defining the primary bearing for said cylindrical portion of said rotor to rotatably mount said rotor in said tube, a second plate in the form of a conductive coating intimately bonded to the outer surface of said ceramic tube, and a mounting member which serves as a support for the dielectric tube and has a portion in engagement with said rotor to limit axial movement thereof and also serve as electrical contact for said rotor.

LEONARD J. SPERRY.

REFERENCES CITED

The following references are of record in the file of this patent:

UNITED STATES PATENTS

| Number | Name | Date |
|---|---|---|
| 2,109,266 | Franklin | Feb. 22, 1938 |
| 2,163,237 | Flanzer | June 20, 1939 |
| 2,217,383 | Robinson | Oct. 8, 1940 |
| 2,219,003 | Braunschweig | Oct. 22, 1940 |
| 2,386,732 | Wohlhieter | Oct. 9, 1945 |
| 2,464,582 | Keim | Mar. 15, 1949 |

FOREIGN PATENTS

| Number | Country | Date |
|---|---|---|
| 440,950 | Great Britain | Jan. 6, 1936 |
| 541,712 | Great Britain | Dec. 8 1941 |